United States Patent [19]

Van Zyl et al.

[11] Patent Number: 4,946,664

[45] Date of Patent: Aug. 7, 1990

[54] METHOD OF MAKING β"-ALUMINA

[75] Inventors: Arnold Van Zyl, Swellendam, South Africa; Graham K. Duncan, Stafford; Peter Barrow, Alvaston, both of England; Michael M. Thackeray, Pretoria, South Africa

[73] Assignee: Lilliwyte Societe Anonyme, Luxembourg

[21] Appl. No.: 301,864

[22] Filed: Jan. 25, 1989

[30] Foreign Application Priority Data

Jan. 25, 1988 [GB] United Kingdom ............... 8801554

[51] Int. Cl.$^5$ ................................. C01F 7/04
[52] U.S. Cl. ............................... 423/600; 423/625; 423/119; 429/193; 501/153; 802/355
[58] Field of Search ................. 501/153; 429/193; 423/600, 625, 119; 502/355

[56] References Cited

U.S. PATENT DOCUMENTS

| | | | |
|---|---|---|---|
| 3,795,723 | 3/1974 | Clendenen et al. | 264/65 |
| 3,859,427 | 1/1975 | Francis et al. | 423/600 |
| 3,895,963 | 7/1975 | McGowan et al. | 501/153 |
| 4,013,477 | 3/1977 | Jatkar et al. | 106/73.4 |
| 4,024,214 | 5/1977 | Foster et al. | 423/600 |
| 4,052,538 | 10/1977 | Eddy et al. | 429/193 |
| 4,113,928 | 9/1978 | Virkar et al. | 429/193 |
| 4,138,455 | 2/1979 | Shaikh et al. | 264/56 |
| 4,339,511 | 7/1982 | Morgan | 429/189 |
| 4,539,276 | 9/1985 | Harbach | 429/191 |
| 4,732,741 | 3/1988 | Duncan et al. | 423/119 |

FOREIGN PATENT DOCUMENTS 963026 2/1975 Canada .
1386244 3/1975 United Kingdom .

OTHER PUBLICATIONS

Synthesis of Sodium B and B" Alumina–Ray et al., 1975, 583–590, Mat. Res. Bull., vol. 10, No. 6, Jun. 1975.
Oxides and Hydroxides of Aluminum–Wefers et al., Alcoa Research Lab, 1972, pp. 40–51.
Two-Step Continuous Sintering Schedules for B"-Al$_2$O$_3$ Ceramics–Kvachkov, et al., Solid Stte Ionics, vol. 7, No. 2 (1982).
Conversion Catalysis and Microstructure Control in the Sintering of Lithia-Stabilized B"-Alumina–Jatkar, et al., Ceramic Microstructures, Westivew Press Boulder, CO, 1976.
Pre-Pilot and Pilot–Plant Development of B"-Alumina Electrolytes and Rutile-Container Current Collectors for the Sodium-Sulfur Battery-Ronald S. Gordon/ to Ford Motor Company Phase III, Final Report, UTE-C-MSE-79-003, Jan. 1979 (vol. II of III).
The Thermal Transformation of Gelatinous Aluminum Hydroxide–Sato, Z. Allg. Chem., 391, 167–173 (1972).
Discussion: Comments on Effect of the Starting . . . J. of Materials Science, 17 (1982); Chapman and Hall Ltd., 3672–3673.

Primary Examiner—Robert L. Stoll
Assistant Examiner—Steven J. Bos
Attorney, Agent, or Firm—Arnold, White & Durkee

[57] ABSTRACT

The invention provides a method of making β"-alumina by heating aluminium oxide in the presence of Na$_2$O. A metal oxide dopant in the form of Li$_2$O, MgO, ZnO, CoO, NiO, FeO or mixtures thereof, or a precursor of the dopant, is dispersed in a cubic-close packed aluminium oxide or a precursor thereof to form a starting mixture which is calcined by heating to 250°–1100° C. in an oxygen-containing atmosphere. Na$_2$O is then dispersed in the calcined starting mixture to form a final mixture, and the final mixture is heated in an oxygen-containing atmosphere to above 1100° C. to produce β"-alumina.

9 Claims, No Drawings

METHOD OF MAKING β''-ALUMINA

THIS INVENTION relates to a method of making β''-alumina. More particularly it relates to a method suitable for making β''-alumina in the form of a polycrystalline artefact, and to such artefacts when made in accordance with the method.

According to the invention there is provided a method of making β''-alumina by heating aluminium oxide in the presence of $Na_2O$, which comprises:

homogeneously dispersing a dopant metal oxide selected from the group comprising $Li_2O$, MgO, ZnO, CoO, NiO, FeO and mixtures of at least two thereof, or a precursor of the dopant metal oxide, in a cubic-close packed aluminium oxide ($Al_2O_3$) or a precursor thereof to form a starting mixture;

calcining the starting mixture by heating it to a temperature in the range 250°–1100° C. in an oxygen-containing atmosphere;

homogeneously dispersing $Na_2O$ (soda) or a precursor thereof in the calcined starting mixture to form a final mixture; and heating the final mixture to a temperature of at least 1100° C. in an oxygen-containing atmosphere to produce β''-alumina from the final mixture.

In particular it is to be noted that all the aluminium oxide precursor used must have the dopant dispersed therein before it is calcined or otherwise heated or fired.

By a precursor of cubic close-packed aluminium oxide is meant a substance which, when heated in air by itself to a temperature of 700° C. and held at that temperature for 2 hours, is converted to a transition alumina with a cubic close-packed oxygen sub-lattice or network, such as, for example, gamma-alumina or eta-alumina.

Similarly, by a precursor of the dopant $Li_2O$, MgO, ZnO, CoO, NiO or FeO is meant a substance which, when heated in air by itself to a temperature of 700° C. and held at that temperature for 2 hours, is converted to the oxide in question, ie $Li_2O$, MgO, ZnO, CoO, NiO or FeO as the case may be; and by a precursor of $Na_2O$ is meant a substance which, when heated in air by itself to a temperature of 700° C. and held at that temperature for 2 hours, is converted to soda, ie sodium oxide ($Na_2O$).

Suitable precursors include the hydroxides, nitrates and carbonates respectively of said Li, Mg, Zn, Co, Ni, Fe or Na. Of these, the carbonates are usually employed, because of cost, availability, stability in air and ease of handling.

The Applicant has found, as far as precursors of aluminium oxide are concerned, that certain hydrated forms of aluminium oxide are particularly suitable for use in the method of the invention. Such hydrates of aluminium oxide need not, in bulk, be stoichiometrically pure, and the proportion of water of hydration can be somewhat variable, without necessarily adversely affecting their utility. It is an advantage of certain of these hydrates that they are available in bulk at relatively low cost, eg lower than the cost of alpha-alumina. Such hydrates include boehmites, bayerites and possibly gibbsites.

Thus, the precursor of aluminium oxide may be hydrated, the method employing a precursor of aluminium oxide which is a member of the group comprising monohydrates of alumina in accordance with the formula $Al_2O_3.mH_2O$ in which m is 1–1,3 and trihydrates of alumina in accordance with the formula $Al_2O_3.nH_2O$ in which n is 3–3,5.

The precursor of aluminium oxide may be a monohydrate of aluminium which is a boehmite, the boehmite having an average crystallite size as determined by X-ray diffraction line broadening and scanning electron microscopy of at least 100 Angstrom units, a d-spacing for the 020 planes as determined by X-ray diffraction of at most 6,8 Angstrom units, a mass loss on heating at 10° C./min from ambient temperature in air to 700° C. of at most 20% by mass, and, when heated at 10° C./min from ambient temperature in air up to 700° C., a maximum rate of mass loss occurring at a temperature of at least 400° C. Preferably said average crystallite size is at least 1000 Angstrom units, said d-spacing is at most 6,5 Angstrom units, said mass loss on heating is at most 17%, and said maximum rate of mass loss occurs at a temperature of at least 500° C. The boehmite may be hydrothermally prepared. By 'hydrothermally prepared' is meant that the boehmite (which can be represented by AlOOH or $Al_2O_3.H_2O$) was prepared by the hydrothermal conversion in water of a dilute alkaline aqueous solution at a temperature in the range 150°–300° C. from alumina trihydrate which in turn had been made by the Bayer process. The Bayer process is described eg in The Condensed Chemical Dictionary, 9th Edition, revised by Gessner G. Hawley, Van Norstrand Reinhold Co., 1977, page 94. This hydrothermal conversion of alumina trihydrate to boehmite is described by Huttig et al in an article entitled 'Information on the System $Al_2O_3.H_2O$'- Z.Anorg. Allg. Chem., 171, 232–243 (1928).

In particular the boehmite may be that available under the trade name Cera Hydrate, from BA Chemicals Plc, Gerrards Cross, Buckinghamshire, Great Britain. Cera Hydrate is hydrothermally prepared, has a specific surface area of $5m^2/g$ (as determined by Brunauer, Emmett and Teller (BET) nitrogen adsorption), and has an average crystallite size as received from BA Chemicals Plc of 20 000 Angstrom units as determined by scanning electron microscopy (and an average crystallite size of 8 000 Angstrom units after milling as described hereunder), and undergoes the major part of its dehydroxylation, when its temperature is raised, at temperatures between 470°–550° C. In this regard it should be noted that boehmite having a theoretically pure crystal structure will have said d-spacing of about 6,11 Angstrom units, a mass loss on heating to 700° C. from ambient of about 15% by mass, and its maximum rate of mass loss (the point of inflection on its thermogravimetric analysis (TGA) curve) will be at about 540° C. when heated at 10° C./min.

Instead, the precursor of aluminium oxide may be a trihydrate of alumina which is a bayerite, the bayerite having an average crystallite size as determined by X-ray line broadening and scanning electron microscopy of at least 100 Angstrom units, a d-spacing for the 001 planes as determined by X-ray diffraction of at most 4,9 Angstrom units, a mass loss on heating at 10° C./min from ambient temperature in air to 700° C. of at most 40% by mass, and, when heated at 10° C./min from ambient temperature in air up to 700° C., a maximum rate of mass loss occurring at a temperature of at least 240° C. Said average crystallite size may be at least 500 Angstrom units, said d-spacing being at most 4,75 Angstrom units, said mass loss on heating being at most 37%, and said maximum rate of mass loss occurring at a temperature of at least 260° C. In this regard it should be noted that bayerite having a theoretically pure crystal structure will have said d-spacing of about 4,67 Angstrom units, a mass loss on heating to 700° C. from ambient at 10° C./hr of about 35% by mass, and its maximum rate of mass loss (the point of inflection on its TGA curve) will be at about 280° C. when heated at 10° C./min.

The Applicant has found that a suitable bayerite for use in accordance with the invention is Kaiser bayerite available from Kaiser Aluminium and Chemical Corporation, Southwest Region, 12600 Northborough Drive, Houston, Tex., United States of America.

In this regard (both for boehmite and bayerite at least) the Applicant has found that large crystallites in the precursor of aluminium oxide used as the starting material (corresponding to a low specific surface area) favour a higher proportion of $\beta''$-alumina in the product, and average crystallite sizes of at least 100 Angstrom units, more preferably at least 8000 Angstrom units or more, are thus desirable. These crystallite sizes correspond to specific surface areas of at most 10 m$^2$/g, more preferably at most 5 m$^2$/g, or less.

Similarly, the Applicant has found that precursors of aluminium oxide used as starting materials which are hydrates of aluminium oxide, eg boehmites or bayerites, are desirable and favour higher proportions of $\beta''$-alumina in the product, if they, upon heating, dehydrate at relatively high temperatures. For example, for boehmite the maximum rate of dehydroxylation, ie the maximum rate of weight loss upon heating, should take place, as mentioned above, above 400° C. and preferably above 500° C. In other words, the major proportion of the dehydroxylation, ie 80% or more of the total potential dehydroxylation, should preferably take place at a high temperature, above say 470° C. (eg in the range of 470°–550° C.) when heated at 10° C./min from ambient up to 700° C. as mentioned above.

These factors, ie relatively large crystallite sizes, relatively low specific surface areas and relatively high temperatures for dehydroxylation, are indicative of a well developed and well ordered crystal structure in the precursor of aluminium oxide used. It thus appears that a well ordered and long range crystal structure in the precursor of aluminium oxide used is desirable, so that it should preferably have large crystallites and a low specific surface area, and should undergo its greatest rate of mass loss and indeed should lose the greatest proportion of its mass upon dehydroxylation, at relatively high temperatures. Kaiser bayerite and, particularly, Cera Hydrate boehmite, meet at least some of these criteria.

By boehmite is meant the orthorhombic form of aluminium oxide monohydrate, $Al_2O_3 \cdot H_2O$, whose crystal lattice structure has the symmetry which is defined by the crystal class (point group) $D_{2h}$; mand by soda, lithia and magnesia are meant respectively $Na_2O$, $Li_2O$ and MgO, ie sodium oxide, lithium oxide and magnesium oxide respectively. By bayerite is meant the monoclinic form of aluminium oxide trihydrate whose crystal lattice structure has the symmetry which is defined by the crystal class $C_{2h}$, as determined by R. Rothbauer, et al. Z. Kristallogr. 125, 317-331 (1967).

By gibbsite is meant the monoclinic form of aluminium oxide trihydrate whose crystal lattice structure has the symmetry which is defined by the crystal class (point group) $C_{2h}$ as defined by H. Saalfeld, Neues. Jahrb. Mineral., Abh., 95. 1-87 (1960).

The $Na_2O$ or precursor thereof dispersed in the starting mixture may amount to 7–10% by mass, as $Na_2O$, of the final mixture after heating thereof to produce $\beta''$-alumina. Preferably when boehmite is the starting material/precursor of aluminium oxide, the mixture after heating contains about 8,5–9,5%, eg 9% by mass soda.

The method can be used merely to form $\beta''$-alumina, or it can be used to form, at the same time, a polycrystalline $\beta''$-alumina artefact, ie a unitary self-supporting mass, as described hereunder. In each case the boehmite, bayerite or like precursor of aluminium oxide will have the dopant metal oxide dispersed therein to act as a stabilizer for the cubic close-packed oxygen sub-lattice until $\beta''$-alumina is formed. Thereafter the dopant will act to stabilize the spinel-type structure of the $\beta''$-alumina formed and, particularly when an artefact is to be made, the dopant will act to resist decomposition of $\beta''$-alumina to $\beta$-alumina during firing up to the temperature required to form a fully dense artefact.

The dopant metal oxide ($Li_2O$, MgO, ZnO, CoO, NiO and/or FeO) or precursor thereof dispersed in the cubic close-packed aluminium oxide or precursor thereof may amount to 0,05–10% by mass as metal oxide, of the final mixture after heating thereof to produce $\beta''$-alumina. In particular, when the precursor of aluminium oxide is boehmite, the final mixture which is heated may be formulated to contain 0,05–6,0% by mass of the dopant, in particular 0,05–1,0% $Li_2O$ or 2,5–6,0% MgO.

In the past each of $Li_2O$, MgO, ZnO, CoO, NiO and FeO have been used as spinel-stabilizers in the formation of $\beta''$-alumina. However, MgO and particularly $Li_2O$ are generally the preferred spinel-stabilizers. For the present invention, similarly, MgO and potentially $Li_2O$ are likewise preferred, so that the dopant may be selected from the group consisting of MgO and $Li_2O$.

The dopant or its precursor may be dispersed in the precursor of aluminium oxide by dry blending or by milling, eg wet milling. The soda or its precursor may be dispersed in the calcined starting mixture by milling, eg wet milling. Preferably in each case the dopant and the soda should be as evenly and homogeneously dispersed as possible or practicable. This is typically effected by milling to a fine particle size after soda addition, the milling acting to cause the dispersion. Milling may thus be in the presence of water and may be by way of a vibro-energy mill or attritor mill so that a proportion of the particles are less than 30 microns in size, and milling is preferably such that at least 80% by mass of the particles are less than 5,5 microns (55 000 Angstrom units) in size. This can be achieved by milling for at least two hours in a vibro-energy mill or attritor mill. After milling, the milled material may be freeze-dried or spray-dried prior to heating to form $\beta''$-alumina.

The calcining of the starting mixture will be essentially to convert the precursor of aluminium oxide to said cubic closepacked form of aluminium oxide such as gamma-alumina or eta-alumina. The temperature to which the starting mixture can be heated to effect the calcining can be, as indicated above, 250°–1100° C., preferably 500°–1050° C., with about 700° C. being a convenient value. The heating rate is not critical and can vary within limits, and need not be constant. Similarly the cooling rate is not critical and can vary within limits and need not be constant. There will typically be a temperature hold or plateau at the maximum calcining temperature, for a sufficient period to effect substantially complete calcining. For a calcining temperature of 700° C. a heating rate of 200° C./hour followed by a 2 hour hold at 700° C. and a subsequent cooling rate of 200° C./hr down to ambient temperature, have been found to be adequate, ie a simple progressive temperature rise to the calcining temperature followed, after a hold, by a simple progressive cooling.

Similarly, heating of the final mixture containing the soda or precursor thereof may be according to a regime wherein the temperature is increased progressively to the maximum temperature to which it is heated, without any intermediate temperature peaks or plateaus. Thus, the heating may be according to a heating regime whereby the temperature of the mixture is progressively increased to a maximum temperature, and is thereafter cooled according to a cooling regime whereby the temperature of the heated product is progressively cooled to ambient temperature. The maximum temperature may be held for a predetermined period, after which said cooling takes place, and the heating of the final mixture may be to a maximum temperature of at least 1100° C.

When the method is used merely to form $\beta''$-alumina, heating will typically be to a temperature lower than that required to form an artefact, whereas for forming an artefact the heating will be at least to a temperature sufficient to cause enough sintering and densification to form a unitary self-supporting artefact comprising essentially $\beta''$-alumina. Thus, for artefact manufacture, heating of the final mixture may be to a maximum temperature, typically above 1200° C., sufficient to form a unitary self-supporting mass from the mixture. When an artefact is to be made, the final mixture may be formed in a green state into an artefact, prior to the heating of the final mixture. The final mixture in dry powder form, containing less then 10% m/m moisture, may be formed into the artefact by pressing to a pressure of 5 000–100 000 psi (1 psi=6,894757×10³ Pa). The pressing may be isostatic pressing and may be to a pressure of 30 000–60 000 psi. However, while isostatic pressing to a pressure of typically above 20 000 psi will usually be employed, on dry powders obtained eg from freeze drying or spray drying, uniaxial pressing or die pressing of the dried powder may instead be employed. Milling of the constituents to mix them will typically be to form a slip having a solids content of about 30–50% by mass, suitable for spray drying or freeze drying, followed by spray drying or freeze drying to less than 4% by mass moisture.

Heating the final mixture may be to a maximum temperature of 1550°–1700° C. and preferably 1580°–1620° C., after pressing thereof to a pressure of at least 35MPa to make a unitary artefact. The rate of heating of the mixture may be between 150 and 300° C./hr from ambient temperature up to said maximum temperature.

The average rate of heating the mixture from ambient temperature up to a maximum temperature may be at most 300° C./hr.

The lower limit of the maximum temperature is set by factors such as an acceptable electrical resistivity in the final artefact, for example for use as a solid electrolyte or separator in an electrochemical cell, and sufficient sintering and strength in the final artefact. Below about 1550° C. maximum temperature the electrical resistivity in the final product will be increased and in particular the strength of the artefact may be unacceptably low for use as a solid electrolyte or separator in an electrochemical cell.

When heating is merely to form $\beta''$-alumina in powder or particulate form, the maximum temperature may be substantially lower, eg to at least 1200° C. or possibly somewhat less. In this case the maximum temperature will be selected by a trade-off between the amount of $\beta''$-alumina produced and factors such as power consumption, materials of construction necessary for the furnace, etc. The product in this case will be produced as a flowable partially processed material intended to be stored for an indeterminate period for eventual use in artefact manufacture. Thus, heating the final mixture may be to a temperature of 1150°–1300° C., to produce a product which is a powder.

A typical heating regime which is believed to be particularly promising involves simply heating calcined Cera Hydrate boehmite starting material containing lithia or magnesia (MgO) and into which has been dispersed soda followed by drying, at a rate of 200° C./hr, maintaining the final temperature reached for a suitable period, eg 15 minutes, and cooling at the same rate.

Heating may be in a furnace, eg an electric furnace or possibly a gas-fired furnace, which furnace is heated up together with the sample from ambient temperature to the maximum temperature, or heating may be in a furnace maintained at the maximum temperature and through which the sample is moved at an appropriate rate, in which case the furnace may be electric.

Heating will typically take place under a soda atmosphere, and the sample being heated may be located in a suitable corrosion resistant refractory container, such as a magnesium oxide or platinum crucible or tube, which may be closed.

The invention extends also to a $\beta''$-alumina, eg in the form of a unitary self-supporting mass or artefact whenever made according to the method described herein, particularly with reference to the Examples herein.

The invention will now be described, in non-limiting fashion, with reference to the following illustrative Examples.

EXAMPLE 1

3 A comparative test was carried out to make unitary sintered polycrystalline $\beta''$-alumina artefacts employing the method of the present invention and, as a control, a method wherein the lithia and soda were added simultaneously after prior calcination of the precursor of aluminium oxide. In each case Cera Hydrate boehmite was used as the precursor of aluminium oxide, and milling and pressing conditions were essentially similar. Calcining and sintering took place simultaneously. In each case the proportions of lithia precursor, soda precursor and boehmite used were so as to give a product made up of:

2,76 mole % lithia (Li$_2$O)
13,38 mole % soda (Na$_2$O)
83,86 mole % aluminium oxide (Al$_2$O$_3$),
ie Na$_{1,70}$Li$_{0,35}$Al$_{10,65}$O$_{17}$.

The aluminium oxide (Al$_2$O$_3$) content of the boehmite had been determined by mass loss on heating to 1400° C. according to the regime:

ambient temperature (20° C.) to 1400° C. at 200° C./hour
hold at 1400° C. for 2 hours
1400° C. to ambient temperature at 200° C./hr.

According to this determination 1,2026 g boehmite was found to be equivalent to 1,0000 g Al$_2$O$_3$.

The precursors of lithia and soda were lithium carbonate and sodium carbonate respectively; and the sodium carbonate was dried at 300° C. overnight prior to use.

Control

The boehmite was calcined as a powder according to the heating regime:

ambient temperature to 700° C. at 200° C./hour
hold at 700° C. for 2 hours
700° C. to ambient temperature at 200° C./hour.

The soda and lithia precursors were then added to the calcined boehmite in powder form and the mixture wet milled in an attritor mill for 2 hours. For every 100 g of powder, 200 ml of distilled water was used, with 300 g of zirconia grinding media (o,8–2,0 mm in diameter), with the mill running at about 916 r.p.m.

After milling, the slurry or slip was separated from the grinding media and freeze-dried by pouring it dropwise into liquid nitrogen. This produced frozen spheres which were dried for 4 days at a pressure of about 0,08 millibars and a condenser temperature of about −45° C.

The dried powder was then formed into pellets of 16 mm diameter at a pressure of 22 000 psi (ie 15 MPa) and then cold isostatically pressed at a pressure of 30 000 psi.

Invention

In contrast to the control, all the boehmite and the lithium carbonate were initially wet milled and freeze-dried, but in exactly the same fashion as described above for mixing the calcined boehmite of the control with lithium carbonate and sodium carbonate. This mixture was then calcined in exactly the same fashion as the boehmite of the control was calcined. This mixture and the boehmite of the control were in fact calcined simultaneously, in the same furnace during the same firing cycle.

The lithia/boehmite calcined mixture was then wet milled with the sodium carbonate and freeze-dried in exactly the same fashion as described above for mixing the calcined boehmite of the control with the lithium carbonate and sodium carbonate.

Cold isostatically pressed pellets were then formed in exactly the same fashion as described above for the control.

Control and Invention

Pellets of the control and made according to the invention were then heated at 200° C./hr from room temperature up to 1600° C. and, after a hold, were cooled to room temperature at 200° C./hr. Certain samples were held at 1600° C. for 5 minutes, and others were held at this temperature for 15 minutes.

After this sintering the product pellets were subjected to density determination by Archimedean methods using xylene; they were subjected to phase analysis by powder X-ray diffraction; and they were subjected to microstructural evaluation using an optical microscopic and a scanning electron microscope (in both cases after polishing the pellets to a surface finish of one micron and thermally etching them at 1400° C. for 30 minutes).

All samples were found to be pure single-phase beta''-alumina, and no additional phases such as NaAlO$_2$ or beta-alumina were detected. Details of densities and microstructure are given in the following Table, Table 1:

TABLE 1

| Sample Type | Hold Time at 1600° C. [minutes] | Density [g/cm$^3$] | Density [% Theoretical] | Micro structure | Crystallite Size microns |
|---|---|---|---|---|---|
| Control | 5 | 3,10 | 95,4 | Uniform | 2–5 |
| Invention | 5 | 3,10 | 95,4 | Uniform | 2–5 |
| Control | 15 | 3,18 | 97,8 | Duplex | — |
| Invention | 15 | 3,16 | 97,2 | Uniform | 2–5 |

(Note: The theoretical density of beta''-alumina was taken as 3,25 g/cm$^3$).

In making dense polycrystalline artefacts of $\beta''$-alumina, eg for use as solid conductors of sodium ions in electrochemical cells, a density as high as possible and as close to theoretical is desirable, as is a uniform, non-duplex microstructure, ie one in which there are no large crystallites present in a matrix of small uniform crystallites. A low density and a duplex microstructure are associated with brittleness, ie lack of toughness, leading to failure by cracking when mechanically stressed or when a current is passed therethrough in a cell. Example 1 shows that the method of the present invention can make $\beta''$-alumina artefacts which are at least as good as those of the control methods.

EXAMPLE 2

Further tests were carried out, similar to those of Example 1, in which the method of the present invention was compared with a control method. Three different compositions were tested, and for each composition five different tests were carried out, namely three in accordance with the invention and two controls.

Thus, batches of about 100g each were made up to have the nominal compositions set out in the following table, Table 2:

TABLE 2

| Composition No. | % by mass Li$_2$O | % by mass Na$_2$O | % by mass Al$_2$O$_3$ |
|---|---|---|---|
| 1 | 0,70 | 9,00 | 90,30 |
| 2 | 0,70 | 9,50 | 89,80 |
| 3 | 1,00 | 9,00 | 90,00 |

The five methods differed from one another as regards whether they were in accordance with the invention or in accordance with the control, ie those in accordance with the invention involved lithia addition prior to calcining whereas the controls involved lithia addition after calcining; they differed as to the nature of the lithia precursor used; and they differed as to whether they were subjected to wet milling only upon soda addition after calcination or both after calcination and prior to calcination.

In each case calcining was as in Example 1, Na$_2$CO$_3$ was the soda precursor and drying was by freeze-drying. The milling was as described above for Example 1 and freeze-drying was carried out in an Edwards Modulyo 12 free-drying unit operated at a condenser temperature of −45° C. and a vacuum of about 0,1 mbar. After addition of soda the final mixture was passed through a 150 μm sieve prior to heating thereof. Pellets were pressed as described for Example 1 and were heated to produce $\beta''$-alumina according to various different heating regimes.

The five different tests can have their differences summarised as follows:

Test 1 (Invention)

In this case there was milling only upon $Na_2O$ addition after calcination, lithia addition being by dry blending and the lithia precursor being $LiOH.H_2O$.

Test 2 (Invention)

In this case there was milling only upon $Na_2O$ addition after calcination, lithia addition being by dry blending and the lithia precursor being $Li_2CO_3$.

Test 3 (Invention)

In this case there was milling both upon $Na_2O$ addition after calcination and upon $Li_2O$ addition before calcination, the lithia precursor being $Li_2CO_3$.

Test 4 (Control)

In this case there was milling only upon addition of $Na_2O$ and $Li_2O$ after calcination, the lithia precursor being $Li_2CO_3$.

Test 5 (Control)

In this case there was milling both upon addition of $Na_2O$ and $Li_2O$ after calcination, and prior to calcination, the lithia precursor being $Li_2CO_3$.

In each case the general procedure of Example 1 was followed, the aluminium oxide precursor being Cera Hydrate boehmite which was initially calcined as in Example 1, and was then wet milled to admix the $Na_2O$ therein followed by drying as in Example 1, pressing into pellets and heating the pellets to produce $\beta''$-alumina. When lithia addition preceded calcining according to the invention and was mixed into the boehmite by wet milling, the initial mixture was dried prior to calcining as in Example 1, but when lithia addition prior to calcining was by dry blending, there was no drying prior to calcining.

Five heating regimes were used to heat the pellets to produce $\beta''$-alumine as follows:

Regime 1 heating at 200° C./hr from ambient (20° C.) to 1400° C.
heating at 100° C./hr from 1400° C. to 1600° C.
hold at 1600° C. for 15 minutes
cooling at 900° C./hr from 1600° C. to 1500° C.
cooling at 200° C./hr from 1500° C. to ambient Regime 2 heating at 200° C./hr from ambient to 1400° C.
heating at 100° C./hr from 1400° C. to 1600° C.
heating at 60° C./hr from 1600° C. to 1617° C.
hold at 1617° C. for 15 minutes
cooling at 900° C./hr from 1617° C. to 1500° C.
cooling at 200° C./hr from 1500° C. to ambient.

Regime 3

This was identical to Regime 2 except that the hold at 1617° C. was for 25 minutes.

Regime 4 heating at 200° C./hr from ambient to 1400° C.
heating at 100° C./hr from 1400° C. to 1585° C.
hold at 1585° C. for 15 minutes
cooling at 200° C./hr from 1585° C. to ambient Regime 5

This was identical to Regime 4 except that the hold at 1585° C. was for 25 minutes.

A rapid heating, low thermal mass furnace was employed with magnesium oxide crucibles to prevent loss of $Na_2O$.

The composition of the samples was confirmed by atomic absorption: Approximately 0,1 g (weighed to=0,1 mg) of each reacted powder was dissolved in analar grade phosphoric acid at approximetely 120° C. The resulting solutions were diluted as necessary and the absorption measured at 330,2 nm for Na and 670,8 nm for Li. Standard samples, of known composition, were always run at the same time as were blanks (ie with no dissolved $\beta''$-alumina). Calibration curves were constructed using a series of solutions of known lithium and sodium concentrations into which a suitable amount of an aluminium salt had been added. The latter was to ensure that so-called matrix effects were kept to a minimum. The concentrations of Li and Na in the sample solutions were then calculated from the relevant absorption values and the $Li_2O$ and $Na_2O$ contents of the original samples determined.

Densities of the sintered ceramics were determined by the Archimedean methods using water.

Microstructures were obtained using a Univar optical microscope after thermally etching the polished samples at 1400° C. for 30 minutes.

Results are summarised in the following table, Table 3:

TABLE 3

| Test No | Mass % $Li_2O$ | Mass % $Na_2O$ | Firing Regime No. | Density g/cm³ | Microstructure |
|---|---|---|---|---|---|
| 1 (Invention) | 0,712 | 9,04 | 1 | 3,130 | Uniform <10 µm |
|  |  |  | 2 | 3,180 | Uniform <10 µm |
|  |  |  | 3 | 3,202 | Uniform <10 µm |
| 2 (Invention) | 0,688 | 9,06 | 1 | 3,185 | Uniform <10 µm |
|  |  |  | 2 | 3,210 | Uniform <10 µm |
|  |  |  | 3 | 3,210 | Uniform <10 µm |
| 3 (Invention) | 0,678 | 8,84 | 2 | 3,148 | Uniform <10 µm |
|  |  |  | 3 | 3,172 | Uniform <10 µm |
| 4 (Control) | 0,707 | 8,89 | 1 | 3,150 | Uniform <10 µm |
|  |  |  | 2 | 3,180 | Uniform <10 µm |
|  |  |  | 3 | 3,169 | Uniform <10 µm |
| 5 (Control) | 0,715 | 8,89 | 1 | 3,180 | Uniform <10 µm |
|  |  |  | 2 | 3,185 | Uniform <10 µm |
|  |  |  | 3 | 3,186 | Uniform <10 µm |
| 6 (Invention) | 0,710 | 9,37 | 1 | 3,184 | Uniform <10 µm |
|  |  |  | 2 | 3,183 | Uniform <10 µm |
| 7 (Invention) | 0,689 | 9,51 | 2 | 3,213 | Uniform <10 µm |
|  |  |  | 3 | 3,209 | Uniform <10 µm |
| 8 (Invention) | 0,708 | 9,30 | 1 | 3,221 | Uniform <10 µm |
|  |  |  | 2 | 3,216 | Uniform <10 µm |
| 9 (Control) | 0,705 | 9,39 | 1 | 3,202 | Uniform <10 µm |
|  |  |  | 2 | 3,201 | Uniform <10 µm |
| 10 (Control) | 0,717 | 9,54 | 1 | 3,227 | Uniform <10 µm |
|  |  |  | 2 | 3,225 | Uniform <10 µm |

TABLE 3-continued

| Test No | Mass % Li$_2$O | Mass % Na$_2$O | Firing Regime No. | Density g/cm$^3$ | Microstructure |
|---|---|---|---|---|---|
| 11 (Invention) | 0,910 | 8,60 | 1 | 3,205 | Duplex with 20-30 μm grains |
| | | | 2 | 3,214 | Not Done |
| | | | 4 | 3,030 | Not Done |
| | | | 5 | 3,173 | Generally uniform <10 μm with a few 10 μm grains |
| 12 (Invention) | 0.975 | 8,91 | 1 | 3,196 | Duplex |
| | | | 2 | 3,209 | Very badly duplex |
| | | | 4 | 3,167 | Not Done |
| | | | 5 | 3,205 | Generally uniform <10 μm with a few 10 μm grains |
| 13 (Invention) | 0,970 | 8,82 | 1 | 3,214 | Very badly duplex |
| | | | 2 | 3,220 | Very badly duplex |
| | | | 4 | 3,180 | Not Done |
| | | | 5 | 3,216 | Generally uniform with a few 10 μm grains |
| 14 (Control) | 0,979 | 9,08 | 1 | 3,208 | Generally uniform with a few 10 μm grains |
| | | | 2 | 3,234 | Very badly duplex |
| | | | 4 | 3,203 | Not Done |
| | | | 5 | 3,225 | Generally uniform with a few 10 μm grains |
| 15 (Control) | 0,980 | 8,84 | 1 | 3,200 | Generally uniform with a few 10 μm grains |
| | | | 2 | 3,203 | Very badly duplex |
| | | | 4 | 3,158 | Not Done |
| | | | 5 | 3,203 | Generally uniform with a few 10 μm grains |

For Test Nos. 1, 6 and 11 the lithia was added as LiOH.H$_2$O and for the remaining tests the lithia was added as LI$_2$CO$_3$. For Tests Nos 3, 5, 8, 10, 13 and 15 there were two milling steps both before and after calcining, and for the remaining methods there was milling after calcining only.

Example 2 also shows that the method of the present invention can make β"-alumina artefacts at least as good as those made by the control methods.

EXAMPLE 3

Example 2 was repeated, with variations, for yet further comparative tests between the method of the invention and controls wherein lithia addition took place after calcination. In each case these was a single milling step, after calcination, any lithia addition prior to calcination being by dry blending. Batch sizes were about 1 kg and wet milling was carried out with 1,5 kg water and 30 kg zirconia grinding media. Drying was by spray-drying using a Niro Atomizer spray-dryer to obtain a free flowing powder which passed through a 45 μm sieve. The powder was compacted into tubes open at one end and closed at the other by a hemispherical end wall, of the type suitable for use as separators in high temperature electrochemical cells, at a pressure of 35 000 psi. These tubes were fired in an upright condition with their closed ends lowermost in magnesia liners to prevent Na$_2$O loss. The following firing regime was used:

Regime 6
heating at 200° C./hr from ambient to 1400° C.
heating at 100° C./hr from 1400° C. to 1600° C.
heating at 60° C./hr from 1600° C. to 1615° C.
hold at 1615° C. for 20 minutes
cooling at 900° C./hr from 1615° C. to 1500° C.
cooling at 200° C./hr from 1500° C. to ambient.

In thirteen tests the method of the invention was followed, lithia being dry blended without milling into the boehmite before calcining, and in two cases for the controls, the lithia was added together with the soda with wet milling. In each case the lithia was added as LiOH.H$_2$O and the soda as Na$_2$CO$_3$ Average results are set out in the following Table, Table 4:

TABLE 4

| Invention Control | % Li$_2$O by mass | % Na$_2$O by mass | Density g/cm$^3$ | Microstructure |
|---|---|---|---|---|
| Invention | 0,716 | 9,07 | 3,197 | Uniform 5 μm |
| Control | 0,712 | 8,96 | 3,208 | Uniform 5 μm |

Average results were also obtained in these tests for strength and resistivity. The tubes made in accordance with the invention had a strength of 304 Mega-Newtons/mm$^2$ (MN/mm$^2$) with a standard deviation of 26, and the controls had a strength of 297 MN/mm$^2$ with a standard deviation of 28. Resistivity results are set out in the following Table, Table 5:

TABLE 5

| Resistivity Direction | Temperature (°C.) | Invention (ohm cm) | Control (ohm cm) |
|---|---|---|---|
| Axial | 275° C. | 5,91 | 5,33 |
| Axial | 300° C. | 4,81 | 4,30 |
| Axial | 350° C. | 3,62 | 3,23 |
| Radial | 250° C. | 7,01 | 6,10 |
| Radial | 300° C. | 6,05 | 5,20 |
| Radial | 350° C. | 4,80 | 4,10 |

From these results it is evident that the artefacts are at least as good when made according to the method of the invention as when made in accordance with the control method, not only as regards density and microstructure, but also as regards resistivity and strength.

The marginally lower resistivity results for the artefacts made by the control method, compared with those made by the method of the present invention are believed to arise from a slightly larger grain size obtained by the control method, as could be seen from a visual inspection of micrographs of the artefacts.

In the following Examples, Examples 4 and 5, phase formation was investigated for a number of compositions which were used to form $\beta''$-alumina in accordance with the invention, and in accordance with control methods. Both MgO and Li$_2$O were employed as dopants to stabilize the $\beta''$-alumina and in each case there was a single milling step, after calcining, the slurry from the milling step being freeze-dried as described above with reference to Example 1. Na$_2$O was added in every case as Na$_2$CO$_3$.

In each case the final mixture after addition of the Na$_2$O was heated to a temperature in the range 1000° C.–1600° C. Closed magnesia crucibles were used for heating to temperatures above 1200° C., and for heating to below this temperature alumina crucibles were used. Those samples heated to above 1200° C. were, prior to heating, formed into pellets by uniaxial pressing to a pressure of 150 MPa.

In each case the product material, after heating, was crushed to a powder, mixed with about 5% of silicon to act as an internal standard, and was subjected to powder X-ray diffraction analyses CuK$_a$ in the 2-theta range 10°–70° C. The phases present were identified by comparing the traces with standard traces obtained from the literature.

EXAMPLE 4

In this Example, MgO was used as the dopant and was added as Mg(NO$_3$)$_2$.6H$_2$O, Na$_2$O being added as Na$_2$CO$_3$ and the Al$_2$O$_3$ precursor again being Cera Hydrate boehmite. The nominal compositions set forth in the following table, Table 6, were used:

TABLE 6

| Composition No | Mole % MgO | Mole % Na$_2$O | Mole % Al$_2$O$_3$ |
|---|---|---|---|
| 1 | 11 | 13 | 76 |
| 2 | 10 | 12,5 | 77,5 |

Compositions 1 and 2 were selected from the literature as typical combinations of magnesia, soda and aluminium oxide for making $\beta''$-alumina.

Simple firing regimes were used, temperatures being increased form ambient at 200° C./hr up to the maximum temperature, this maximum temperature being held for a period, followed by cooling at 200° C./hr to ambient temperature. In the tests in accordance with the method of the present invention the dopant was added by dry blending prior to the calcining, the soda being added during wet milling after calcining. In the controls, both the dopant and soda were added during the wet milling.

Results are shown in the following table, Table 7:

TABLE 7

| Composition No. | Maximum Firing Temperature [°C.] | Hold Time [hrs] | Phases Present |
|---|---|---|---|
| 1 (Invention) | 1100 | 2 | $\beta''$-Al$_2$O$_3$ + NaAlO$_2$ |
| | 1200 | 2 | $\beta''$-Al$_2$O$_3$ + NaAlO$_2$ |
| | 1450 | ½ | $\beta''$-Al$_2$O$_3$ + NaAlO$_2$ |
| 1 (Control) | 1100 | 2 | $\beta''$-Al$_2$O$_3$ + MgAl$_2$O$_4$ [spinel] + NaAlO$_2$ |
| | 1200 | 2 | $\beta''$-Al$_2$O$_3$ + MgAl$_2$O$_4$ [spinel] + NaAlO$_2$ |
| | 1450 | ½ | $\beta''$-Al$_2$O$_3$ + NaAlO$_2$ |
| 2 (Invention) | 1100 | 2 | $\beta''$-Al$_2$O$_3$ + NaAlO$_2$ |
| | 1200 | 2 | $\beta''$-Al$_2$O$_3$ + NaAlO$_2$ |
| | 1450 | ½ | $\beta''$-Al$_2$O$_3$ + NaAlO$_2$ |
| 2 (Control) | 1100 | 2 | $\beta''$Al$_2$O$_3$ + MgAl$_2$O$_4$ [spinel] + NaAlO$_2$ |
| | 1200 | 2 | $\beta''$-Al$_2$O$_3$ + MgAl$_2$O$_4$ [spinel] + NaAlO$_2$ |
| | 1450 | ½ | $\beta''$-Al$_2$O$_3$ + NaAlO$_2$ |

The results shown in Table 7 clearly indicate that the method of the present invention involved a superior degree of mixing into the boehmite of the Mg$^{2+}$ stabilizing ion of the dopant, compared with the controls. This difference can be noted particularly at low reaction temperatures (ie 1100° C. and 1200° C.) by the presence in the controls of small amounts (5–10% by mass) of the spinel phase MgAl$_2$O$_4$. The increased reaction rates associated with higher temperatures (ie 1450° C.) result in the subsequent removal of these compositional inhomogeneities so that differences between the methods of the invention and the control methods were not apparent at 1450° C.

The phases present in the product were determined by X-ray diffraction, and the X-ray diffraction traces obtained for the products made in accordance with the control methods were found to be similar to those reported in the literature.

EXAMPLE 5

In Example 5 tests were carried out essentially similar to those described above for Example 4, except that lithia as LiOH.H$_2$O was used instead of magnesia as the dopant. Tests were carried out for the nominal compositions (as the oxides) set out in the following Table, Table 7:

TABLE 7

| Composition No | % by mass LiO$_2$ | % by mass Na$_2$O | % by mass Al$_2$O$_3$ |
|---|---|---|---|
| 3 | 0,1 | 9,0 | 90,9 |
| 4 | 0,2 | 9,0 | 90,8 |

It is to be emphasised that the lithia contents set out in Table 7 are unusually low in the art, lithia contents of the order of 0,65–0,75 typically being employed in the art. The use of these low lithia contents emphasises the utility and improvement in the art constituted by the method of the present invention.

For the compositions set forth in Table 7 the method of the present invention was compared with controls. In accordance with the present invention the lithia was added to the Al$_2$O$_3$ by dry blending prior to calcining, the soda being added by wet milling after calcining.

As in Example 4, drying was by freeze-drying as described in Example 1.

As regards the controls, the lithia was added together with the soda during the wet mixing after calcining.

The heating of the final mixture to produce $\beta''$-alumina was at 200° C./hr in each case from ambient, followed by a hold of 15 minutes at the maximum temperature, followed by cooling at 200° C./hr down to ambient temperature.

When the maximum temperature was 1200° C. or 1500° C., single-phase $\beta''$-alumina was obtained in every case as the only product. However, when the maximum temperature was 1600° C. $\beta$-alumina was found to be present together with $\beta''$-alumina. For heating in this fashion results are set forth in the following Table, Table 8:

TABLE 8

| Composition No. | % by mass $\beta$-alumina | % by mass $\beta''$-alumina |
|---|---|---|
| 3 (Invention) | 4 | 96 |
| 3 (Control) | 82 | 18 |
| 4 (Invention) | 0 | 100 |
| 4 (Control) | 44 | 56 |

The results set forth in Table 8 clearly indicate that the method of the present invention, when compared with the control method, leads to the production of substantially and surprisingly higher proportions of $\beta''$-alumina product for exceptionally low lithia compositions. Were no lithia dopant to be employed, an essentially pure $\beta$-alumina product would be expected under these reaction conditions, with a complete absence of $\beta''$-alumina.

The Examples confirm that the method of the present invention is at least competitive with the control method which is representative of the prior art. Example 4, in particular, indicates that the method of the present invention leads to a superior degree of mixing of the dopant with the aluminium oxide precursor (Cera Hydrate boehmite) employed, when compared with the control. This feature permits, particularly for the production of $\beta''$-alumina in powder form, the use of lower heating temperatures for heating the final mixture to produce the $\beta''$-alumina, with attendant savings in costs. Example 5, however, particularly and more importantly shows that the method of the present invention permits the use of substantially lower proportions of lithia dopant, than is possible using the prior art control method. As lithia is the preferred dopant and is expensive, this advantage can lead to a substantial cost saving.

When dense polycrystalline artefacts of $\beta''$-alumina are made, eg for use as solid conductors of sodium ions in electrochemical cells, a density as high as possible and as close as to theoretical as possible is desirable, as is a uniform, non-duplex microstructure, ie one in which there are no large crystallites present in a matrix of small uniform crystallites. A low density and a duplex microstructure are associated with brittleness, ie a lack of toughness, leading to failure by cracking when mechanically stressed or when an electrical current is passed therethrough in an electrochemical cell. From the Examples, the method of the present invention promises routinely to make dense polycrystalline artefacts of $\beta''$-alumina of acceptably high density and non-duplex microstructure, in a reliable fashion over a wide compositional range with inexpensive starting materials. As these advantages appear to arise from the better mixing of the dopant afforded by the method of the present invention, equally improved results are expected for other dopants typically used in the art, ie ZnO, CoO, NiO and FeO.

We claim:

1. A method of making $\beta''$-alumina which comprises:
    homogeneously dispersing a dopant metal oxide selected from the group comprising Li$_2$O, MgO, ZnO, CoO, NiO, FeO and mixtures of at least two thereof, or a precursor of the dopant metal oxide, in a cubic close-packed aluminium oxide (Al$_2$O$_3$) or a precursor thereof to form a starting mixture;
    calcining the starting mixture by heating it to a temperature in the range 250°–1100° C. in an oxygen-containing atmosphere;
    homogeneously dispersing Na$_2$O or a precursor thereof, in the calcined starting mixture to form a final mixture; and
    heating the final mixture to a temperature in an oxygen-containing atmosphere of at least 1100° C. to produce $\beta''$-alumina from the final mixture.

2. A method as claimed in claim 1, in which a precursor of aluminum oxide is employed which is a member of the group consisting of monohydrates of alumina in accordance with the formula Al$_2$O$_3$.mH$_2$O in which m is 1–1.3 and trihydrates of alumina in accordance with the formula Al$_2$O$_3$.nH$_2$O in which n is 3–3.5.

3. A method as claimed in claim 1, in which the Na$_2$O or precursor thereof dispersed in the starting mixture amount to 7–10% by mass, as Na$_2$O, of the final mixture after heating thereof to produce $\beta''$-alumina.

4. A method as claimed in claim 1, in which the dopant metal oxide or precursor thereof dispersed in the cubic close-packed aluminum oxide or precursor thereof amounts to 0.05–10% by mass, as metal oxide, of the final mixture after heating thereof to produce $\beta''$-alumina.

5. A method as claimed in claim 1, in which the dopant is selected from the group consisting of MgO, Li$_2$O and said precursors thereof.

6. A method as claimed in claim 1, in which the temperature to which the starting mixture is heated to effect the calcining is 500°–1050° C.

7. A method as claimed in claim 1, in which heating the final mixture is to a temperature of 1550°–1700° C., after pressing thereof to a pressure of at least 35 MPa, to make a unitary artefact.

8. A method as claimed in claim 1, in which said heating of the final mixture is to a temperature of 1150°–1300° C., so as to produce a product which is a powder.

* * * * *